(12) United States Patent
    Eicher

(10) Patent No.: US 10,731,727 B2
(45) Date of Patent: Aug. 4, 2020

(54) PRESTRESSING CABLE, IN PARTICULAR FOR STATIC STRUCTURES

(71) Applicant: FATZER AG DRAHTSEILFABRIK, Romanshorn (CH)

(72) Inventor: Bernhard Eicher, Arbon (CH)

(73) Assignee: FATZER AG DRAHTSEILFABRIK, Romanshorn (CH)

( * ) Notice: Subject to any disclaimer, the term of this patent is extended or adjusted under 35 U.S.C. 154(b) by 322 days.

(21) Appl. No.: 15/517,012

(22) PCT Filed: Sep. 29, 2015

(86) PCT No.: PCT/EP2015/072382
  § 371 (c)(1),
  (2) Date: Apr. 20, 2017

(87) PCT Pub. No.: WO2016/058823
  PCT Pub. Date: Apr. 21, 2016

(65) Prior Publication Data
  US 2017/0299018 A1    Oct. 19, 2017

(30) Foreign Application Priority Data

Oct. 17, 2014   (CH) ........................................ 1607/14

(51) Int. Cl.
  *F16G 11/04*    (2006.01)
  *D07B 9/00*     (2006.01)
  *E04C 5/12*     (2006.01)

(52) U.S. Cl.
  CPC .............. *F16G 11/042* (2013.01); *D07B 9/00* (2013.01); *E04C 5/122* (2013.01); *E04C 5/125* (2013.01)

(58) Field of Classification Search
  CPC ....... F16G 11/025; F16G 11/04; F16G 11/042; D07B 9/00; E04C 5/12; E04C 5/122; Y10T 403/473; Y10T 403/475; Y10T 24/3909; Y10T 24/4791; E01D 19/14; E01D 19/16
  USPC .................................................. 403/268, 269
  See application file for complete search history.

(56) References Cited

U.S. PATENT DOCUMENTS

| 1,293,383 | A | * | 2/1919 | Eaton | F16G 11/12 |
| | | | | | 403/43 |
| 2,803,486 | A | * | 8/1957 | Larson | A01G 23/006 |
| | | | | | 294/82.11 |
| 3,264,017 | A | * | 8/1966 | Lagarde | F16G 11/042 |
| | | | | | 174/177 |

(Continued)

FOREIGN PATENT DOCUMENTS

| DE | 3723534 A1 | * | 1/1989 | ............. E04C 5/125 |
| DE | 3723534 A1 | | 1/1989 | |

(Continued)

*Primary Examiner* — Jonathan P Masinick
(74) *Attorney, Agent, or Firm* — Brian Roffe

(57) ABSTRACT

A prestressing cable, in particular for static structures, that includes a longitudinal element and connection elements at the end faces of the longitudinal element. The longitudinal element has stranded wires, the end faces of which are anchored into the connection elements. The prestressing cable includes approximately parallel strands, each of which has stranded wires. The wires are spread apart at their end faces in the funnel-shaped opening of the respective connection element and anchored by a casting process, wherein the frustum-shaped funnel widens away from the strands.

20 Claims, 2 Drawing Sheets

(56) References Cited

U.S. PATENT DOCUMENTS

| | | | |
|---|---|---|---|
| 3,507,949 A * | 4/1970 | Robert | F16G 11/042 24/265 EE |
| 3,551,960 A | 1/1971 | Little | |
| 3,665,587 A * | 5/1972 | Michaelsen | F16G 11/042 29/461 |
| 3,672,006 A * | 6/1972 | Fidrych | F16G 11/02 24/115 N |
| 3,739,457 A | 6/1973 | Davis | |
| 4,150,473 A | 4/1979 | Dietrich | |
| 4,317,640 A * | 3/1982 | Peeling | F16G 11/042 403/268 |
| 4,459,722 A | 7/1984 | Dziedzic et al. | |
| 4,469,756 A | 9/1984 | Jungwirth et al. | |
| 4,645,867 A | 2/1987 | Annas | |
| 5,079,879 A * | 1/1992 | Rodriguez | E04C 5/12 24/122.6 |
| 5,231,752 A | 8/1993 | Hereford | |
| 5,597,017 A | 1/1997 | Eicher et al. | |
| 6,279,858 B1 | 8/2001 | Eicher | |
| 6,292,967 B1 * | 9/2001 | Tabatabai | E01D 19/16 14/22 |
| 6,350,077 B1 | 2/2002 | Palmquist | |
| 6,523,207 B1 * | 2/2003 | Stubler | E01D 19/16 14/22 |
| 7,195,417 B2 * | 3/2007 | Shiao | F01D 5/066 403/408.1 |
| 7,228,599 B2 * | 6/2007 | Dupont | F16G 11/042 24/115 N |
| 7,451,527 B2 * | 11/2008 | Pearce | F16G 11/05 24/122.6 |
| 8,327,506 B2 * | 12/2012 | Klein | F16G 11/00 24/122.6 |
| 9,850,630 B2 * | 12/2017 | Annan | E04C 5/122 |
| 2004/0128776 A1 * | 7/2004 | Eicher | E01D 19/14 14/22 |
| 2012/0297703 A1 * | 11/2012 | Sentry | E04C 5/122 52/166 |

FOREIGN PATENT DOCUMENTS

| | | |
|---|---|---|
| DE | 4437104 C1 | 11/1995 |
| WO | 2016058823 A1 | 4/2016 |

* cited by examiner

PRESTRESSING CABLE, IN PARTICULAR FOR STATIC STRUCTURES

FIELD OF THE INVENTION

The invention relates to a prestressing cable, in particular for static structures, comprising a longitudinal element and connection elements at the end faces, the longitudinal element having a plurality of stranded wires, the end faces of which are anchored into the connection elements.

BACKGROUND OF THE INVENTION

Prestressing cables of this type are mainly used for prestressed concrete structures such as e.g. reinforced concrete bridges or flat ceilings of office, commercial and school buildings and sports facilities as well as in rock or ground anchors and similar constructions. They consist of a multi-wired cable construction, each being fitted autonomously as a single cable and generally being anchored in the connection elements at the end faces by means of a complex wedge system, e.g. with end pins as a stop element.

In existing prestressing cable systems, the wedge end connections are often assembled at the construction site because they require a prestressing force for the force transmission. This process is complex and is associated with increased risk of error because the infrastructure, in particular the spatial circumstances, are unfavorable. This results in considerable assembly and fitting costs as well as delays in the provision of the ready-for-assembly strands.

OBJECTS AND SUMMARY OF THE INVENTION

The object of the invention is to avoid these disadvantages and to devise a prestressing cable of the type specified at the start which is inexpensive to produce and can easily be transported to the construction site already assembled and in the finished state.

According to the invention this object is achieved in that the prestressing cable is composed of multiple approximately parallel strands, the wires of which are spread apart at their end faces in the respective connection element and are anchored therein.

Since the strands run parallel to one another between the connection elements, a function is offered as in a typical spiral wire cable which consists of a single multi-wired, multi-layered stranded cable. The straight arrangement of multiple strands instead of a single, multi-layered stranded spiral wire cable means that the E-modulus is increased and that in particular the properties relating to the vibrational loads, even with wires of high strength, are considerably better.

These prestressing cables according to the invention can be assembled in a production hall with the optimal infrastructure under controlled conditions and be transported in more or less this state.

It is particularly advantageous here if the wires of the strands are stretched at their ends and pushed apart like a broom in a funnel-shaped opening of the connection elements. In this way, when casting the cable wires the latter are anchored deeply after the casting compound has hardened, and this guarantees that the prestressing cable reliably withstands the pre-calculated loading.

In order to increase the strength of the anchoring the invention also makes provision such that the end faces of the cable wires are compressed individually or a number of them are compressed together in a bulge prior to casting.

The advantages described above are offered in particular with prestressed cables the strands of which are provided with at least two, preferably seven cable wires.

Since the prestressing cable is loaded most strongly at the end of the connection elements by friction and pressure, it is advantageous to provide each of the strands with a plastic coating.

In particular in installations of which the prestressing cables may bend due to the construction of the installation, provision is made according to the invention such that the strands in the longitudinal direction of the longitudinal element are bundled with strips of stainless steel or plastic arranged a distance apart from one another. In this way it is possible to hold the strands together over the entire length without their different tendencies to curve having any effect upon their compact arrangement.

In this connection it may also be advantageous if the strands are entirely coated or have a spiral wire wound around them so as to cover their length.

In order to maintain the strand geometry the strands may also be provided with correspondingly formed spacers. This is particularly advantageous if the prestressing cable are composed of strands with different constructions and/or diameters.

BRIEF DESCRIPTION OF THE DRAWINGS

In the following the invention will be described in more detail by means of exemplary embodiments with reference to the drawings. These show as follows.

DETAILED DESCRIPTION OF THE INVENTION

Figure 1:
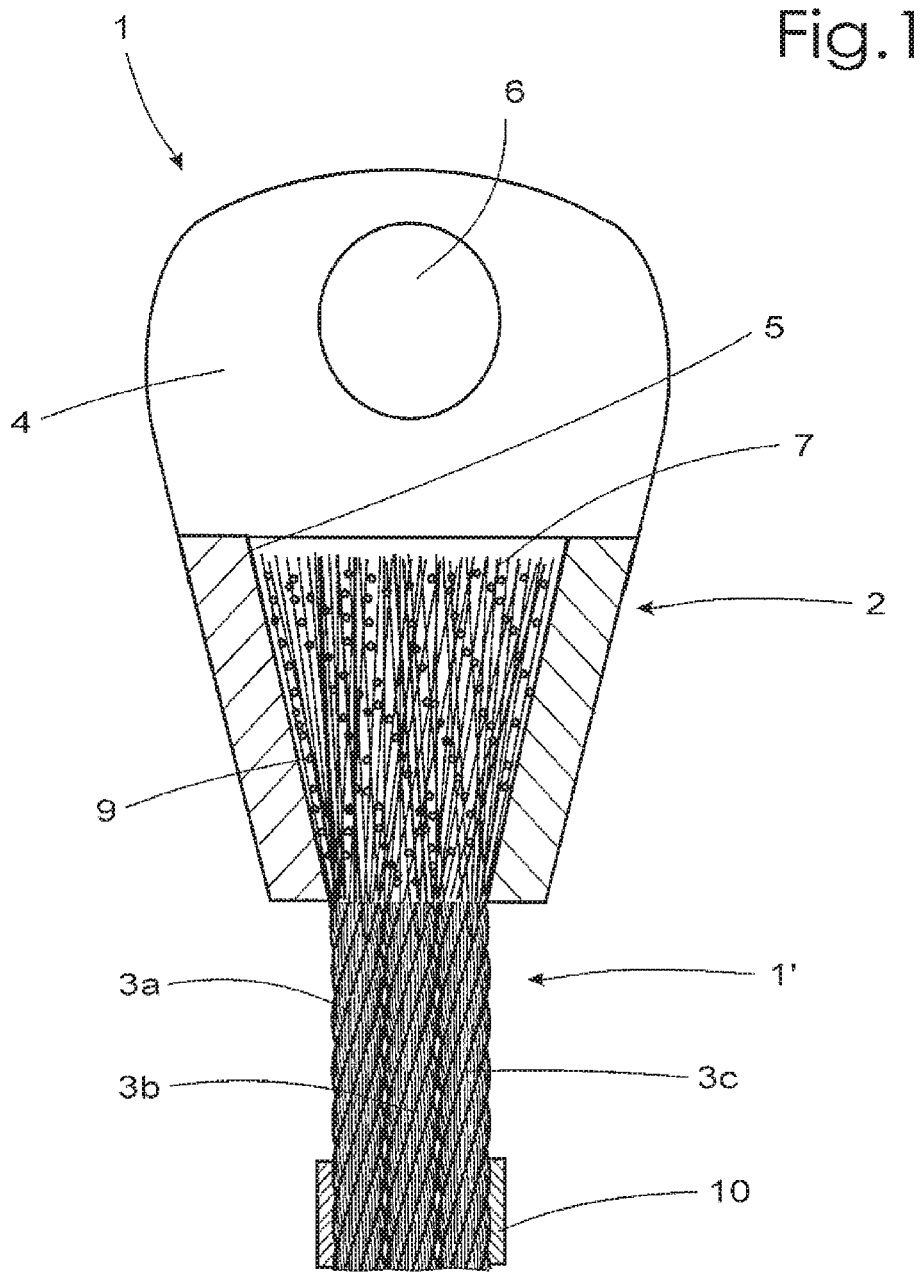
FIG. 1 is a view with a section through a connection element of a prestressing cable according to the invention.

FIG. 1 shows a prestressing cable 1 in a partial view in which the connection of the longitudinal element 1' to one of the connection elements 2 of the prestressing cable 1 is shown. These connection elements 2 are made in the form of forked sleeves 4, as shown. Depending on the application, these could also be made in the form of eye sleeves or the like.

According to the invention, the longitudinal element 1' consists of multiple individual, approximately parallel strands of which the strands 3a, 3b and 3c which are anchored in the connection element 2 can be seen in FIG. 1.

The connection element 2 has a funnel-shaped opening 5 for receiving the strands 3a, 3b, 3c and a transverse round hole 6 for receiving an anchor bolt or a similar component.

The strands 3a, 3b, 3c are composed of a number of stranded wires 7 which are stranded together in each strand and are pushed apart like a broom at their end faces in the region of the funnel-shaped opening 5 and so are spread towards their end, the frustum-shaped funnel of this opening 5 widening away from the strands 3a, 3b, 3c. The angle of this widening relative to the longitudinal axis of the prestressing cable is approximately 10°. It could of course also be chosen to be different.

The number of wires of the individual strands depends upon the respective constructional and mechanical requirements. There are at least two wires per strand. In practice strands each having seven wires are preferred. The straight arrangement of a number of prestressing cables instead of a single, multi-layered stranded spiral wire cable offers the advantage that the elasticity modulus is increased, and that in particular the vibrational load properties are considerably better, even with wires of high strength.

The wire ends 7 projecting into the frustum-shaped opening 5 are cast in the latter with a casting compound 9, for example with a two-component synthetic resin when cold casting or with a zinc or lead alloy with a relatively low melting point when hot casting. After the casting compound has hardened a deep connection is produced between the wires 7 and the forked sleeve 4 and therefore high resistance to the cable wires being pulled out. In order to increase this resistance the wires 7 of the strands can be compressed at their end faces individually or in groups in a bulge.

The strands 3a, 3b, 3c are bundled in the longitudinal direction with strips 10 of stainless steel or plastic arranged a distance apart from one another, which strips hold the strands together over the entire length. The individual strands of the bending prestressing cables are thus prevented from being able to curve to different degrees.

The same effect can be achieved if the strands 3a, 3b, 3c are coated over their entire length or are enclosed by a spiral wire wrapped around them.

In the exemplary embodiment described, the strands 3a, 3b, 3c are identical as regards construction and diameter. Depending on the application, it may, however, be advantageous to use strands with different constructions and/or different diameters. They may be provided with correspondingly formed spacers (not shown) for maintaining the strand geometry over the entire length.

The pre-fabricated strands 3a, 3b, 3c are already cut to length in the factory and anchored in the forked sleeves 4 by the latter first of all being placed over the cable wires 7, the wire ends then being stretched and being pressed apart from one another like a broom by hand or by means of a compressing device in the funnel-shaped opening 5 of the forked sleeve, and the casting compound 9 then being poured into the funnel. After the casting compound has hardened after a short time, the strands 3a, 3b, 3c are securely anchored in the connection elements 2 and the prestressing cable is thus ready for transportation and fitting.

Figure 2:
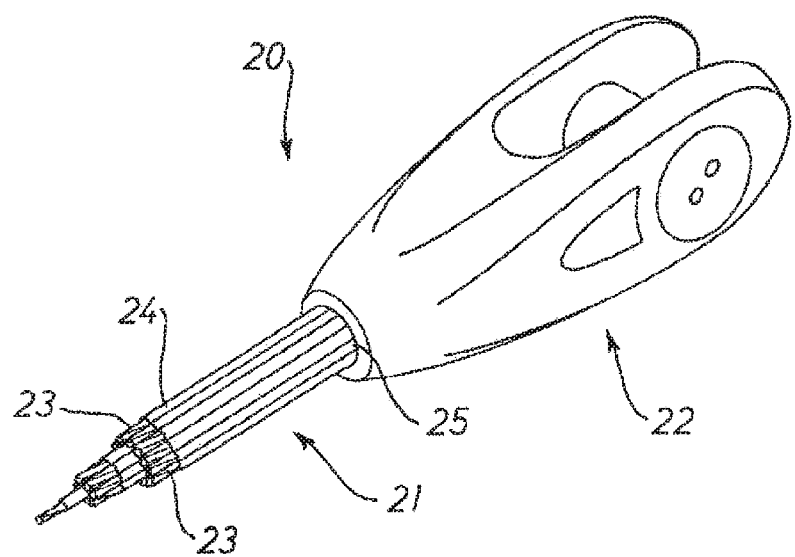
FIG. 2 is a perspective view of a prestressing cable according to the invention with cut strands.

FIG. 2 shows an existing prestressing cable 20 with a connection element 22 and strands 23 of a longitudinal element 21 which is formed in the same way as that of FIG. 1, and so only the differences will be explained in the following. In the cross-over region between the longitudinal element 21 and the connection elements 22, which are particularly subjected to friction and pressure, the strands 23 are each provided with a plastic coating 24 which in each case, projects into the funnel-shaped opening 25 of the connection element 22, preferably to a depth of one to two times the strand diameter.

These plastic coatings 24 of the strands 23 can be formed only in this cross-over region or also over the entire length of the strands, and so offer an aesthetic function or corrosion protection. Another possibility is for only the outside strands 23 to be provided with a plastic coating.

The invention claimed is:

1. A prestressing cable, comprising:
a longitudinal element including a plurality of individual parallel strands, each of the individual parallel strands comprising a plurality of stranded wires situated adjacent one another and which have a spiral shape, each of the stranded wires comprising a plurality of wires twisted together, the wires of the stranded wires of each of the plurality of individual parallel strands having end faces; and
a pair of connection elements one at each end of the longitudinal element, the end faces of the wires of the stranded wires of each of the individual parallel strands being anchored into the connection elements such that at each end of the longitudinal element, the end faces of all of the wires of all of the stranded wires of all of the of individual parallel strands are together in a common space in a respective one of the connection elements, wherein
each of the individual parallel strands extends straight in a longitudinal direction between the connection elements and has a longitudinal axis, the individual parallel strands being separate from one another between the connection elements and alongside one another in the longitudinal direction between the connection elements, the longitudinal axes of the individual parallel strands extending straight in the longitudinal direction parallel to one another between the connection elements, and wherein
the individual parallel strands are configured at a cross-over region between the longitudinal element and one of the connection element such that at the cross-over region, one of the individual parallel strands is circumferentially surrounded by a plurality of other ones of the individual parallel strands and a circumferential surface of the one of the individual parallel strands does not contact the connection element of the cross-over region.

2. The prestressing cable according to claim 1, wherein each of the connection elements includes a funnel-shaped opening and the end faces of the wires of the stranded wires of each of the individual parallel strands are spread apart in the funnel-shaped opening of the respective one of the connection elements, the funnel-shaped opening widening in a direction away from the individual parallel strands.

3. The prestressing cable according to claim 2, wherein the end faces of the wires of the stranded wires of each of the individual parallel strands are compressed individually or a number of the end faces of the wires of the stranded wires of each of the individual parallel strands are compressed together in a bulge.

4. The prestressing cable according to claim 2, wherein the wires of the stranded wires of the individual parallel strands are pushed apart at their ends like a broom in the funnel-shaped opening of the respective connection element.

5. The prestressing cable according to claim 2, wherein each of the individual parallel strands has a different numbers of wires and the individual parallel strands have different diameters.

6. The prestressing cable according to claim 1, wherein each of the connection elements includes a funnel-shaped opening and the wires of the stranded wires of each of the individual parallel strands are pushed apart at their ends like a broom in the funnel-shaped opening of the respective one of the connection elements.

7. The prestressing cable according to claim 1, wherein each of the individual parallel strands further includes a plastic coating at least in the cross-over region.

8. The prestressing cable according to claim 1, further comprising strips of stainless steel or plastic arranged a distance apart from one another in the longitudinal direction of the longitudinal element and that bundle the individual parallel strands together.

9. The prestressing cable according to claim 1, wherein the individual parallel strands are coated over their length and/or have a spiral wire wound around them so as to cover their length.

10. The prestressing cable according to claim 1, wherein each of the individual parallel strands has a different number of wires than any other of the individual parallel strands and the individual parallel strands have different diameters.

11. The prestressing cable according to claim 1, wherein each of the individual parallel strands includes seven stranded wires.

12. The prestressing cable according to claim 1, wherein the individual parallel strands are configured at an additional cross-over region between the longitudinal element and the other one of the connection elements such that at the additional cross-over region, one of the individual parallel strands is circumferentially surrounded by a plurality of other ones of the individual parallel strands and a circumferential surface of the one of the individual parallel strands does not contact the connection element of the additional cross-over region.

13. The prestressing cable according to claim 1, further comprising strips of stainless steel or plastic arranged a distance apart from one another in the longitudinal direction of the longitudinal element and that restrict curving of the individual parallel strands in order to maintain the individual parallel strands straight.

14. The prestressing cable of claim 1, wherein the prestressing cable is made by:
   placing each end of the longitudinal element into a funnel-shaped opening of a respective one of the pair of connection elements such that each of the individual parallel strands is situated in the funnel-shaped opening; then
   pushing the wires of the stranded wires of the individual parallel strands apart at their ends like a broom in the funnel-shaped opening of the respective one of the connection elements; and then
   anchoring the ends of the wires of the stranded wires of the individual parallel strands into the connection elements.

15. A prestressing cable, comprising:
   a longitudinal element including a plurality of individual parallel strands, each of the individual parallel strands comprising a plurality of stranded wires situated adjacent one another and which have a spiral shape, each of the stranded wires comprising a plurality of wires twisted together, the wires of the stranded wires of each of the plurality of individual parallel strands having end faces; and
   a pair of connection elements one at each end of the longitudinal element, the end faces of the wires of the stranded wires of each of the individual parallel strands being anchored into the connection elements such that at each end of the longitudinal element, the end faces of all of the wires of all of the stranded wires of all of the individual parallel strands are together in a common space in a respective one of the connection elements, wherein
   each of the individual parallel strands extends straight in a longitudinal direction between the connection elements and has a longitudinal axis, the individual parallel strands being separate from one another between the connection elements and alongside one another in the longitudinal direction between the connection elements, the longitudinal axes of the individual parallel strands extending straight in the longitudinal direction parallel to one another between the connection elements, and wherein
   the individual parallel strands are configured at a respective cross-over region between the longitudinal element and each of the connection elements such that at the cross-over regions, one of the individual parallel strands is circumferentially surrounded by a plurality of other ones of the individual parallel strands and a circumferential surface of the one of the individual parallel strands does not contact the connection element of the cross-over regions.

16. The prestressing cable according to claim 15, wherein each of the connection elements includes a funnel-shaped opening.

17. The prestressing cable according to claim 16, wherein the end faces of the wires of the stranded wires of each of the individual parallel strands are spread apart in the funnel-shaped opening of the respective one of the connection elements.

18. The prestressing cable according to claim 17, wherein the funnel-shaped opening widens in a direction away from the individual parallel strands.

19. The prestressing cable according to claim 15, further comprising strips of stainless steel or plastic arranged a distance apart from one another in the longitudinal direction of the longitudinal element and that bundle the individual parallel strands together.

20. The prestressing cable according to claim 15, wherein each of the individual parallel strands has a different numbers of wires and the individual parallel strands have different diameters.

\* \* \* \* \*

UNITED STATES PATENT AND TRADEMARK OFFICE
CERTIFICATE OF CORRECTION

PATENT NO. : 10,731,727 B2
APPLICATION NO. : 15/517012
DATED : August 4, 2020
INVENTOR(S) : Bernhard Eicher Page 1 of 1

It is certified that error appears in the above-identified patent and that said Letters Patent is hereby corrected as shown below:

In the Claims

Claim 1, Column 4, Line 10, before "individual", delete "of".

Signed and Sealed this
Twentieth Day of October, 2020

Andrei Iancu
*Director of the United States Patent and Trademark Office*